US006693633B2

(12) United States Patent
Loomis et al.

(10) Patent No.: US 6,693,633 B2
(45) Date of Patent: Feb. 17, 2004

(54) COMPUTER-IMPLEMENTED NODE SPREADER

(75) Inventors: Jeremy John Loomis, Philippi, WV (US); Jyoti Yakowenko, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 175 days.

(21) Appl. No.: 09/849,643

(22) Filed: May 4, 2001

(65) Prior Publication Data

US 2002/0163517 A1 Nov. 7, 2002

(51) Int. Cl.$^7$ .............................................. G06T 15/20
(52) U.S. Cl. ...................................... 345/427; 345/848
(58) Field of Search ................................ 345/441, 712, 345/713, 767, 788, 834, 855, 427, 440, 848

(56) References Cited

U.S. PATENT DOCUMENTS

| | | | |
|---|---|---|---|
| 5,546,529 A | 8/1996 | Bowers et al. | 345/848 |
| 5,555,354 A | 9/1996 | Strasnick et al. | 345/407 |
| 5,590,250 A | * 12/1996 | Lamping | 345/427 |
| 5,786,820 A | 7/1998 | Robertson | 345/853 |
| 6,057,843 A | 5/2000 | Van Overveld et al. | 345/854 |
| 6,204,850 B1 | 3/2001 | Green | 345/850 |
| 6,281,899 B1 | 8/2001 | Gould et al. | 345/848 |
| 6,304,260 B1 | 10/2001 | Wills | 345/853 |
| 6,326,988 B1 | 12/2001 | Gould et al. | 345/850 |
| 6,449,744 B1 | 9/2002 | Hansen | 714/738 |

OTHER PUBLICATIONS

John Lamping et al., "A Focus+Context Technique Based on Hyperbolic Geometry for Visualizing Large Hierarchies", 1995, Xerox Palo Alto Research Center, pp. 401–408.*

* cited by examiner

*Primary Examiner*—Matthew Luu
(74) *Attorney, Agent, or Firm*—Jones Day (57) ABSTRACT

A computer-implemented method and system for displaying nodes on a display device. First positions are used for locating a first node and a second node on the display device. The first node and second node are separated from each other and are at least substantially equidistant from a predetermined center position. Second positions are determined for the first node and second node such that angular shift of the first node from its first position to its second position is different in magnitude than angular shift of the second node from its first position to its second position. These angular shifts for the first node and second node are with respect to the center position. The first node and second node are displayed on the display device based upon the determined second positions for the first node and second node.

21 Claims, 13 Drawing Sheets

COMPUTER-IMPLEMENTED NODE SPREADER

BACKGROUND

1. Technical Field

The present invention is related to the field of computer graphical user interfaces, and more particularly to computer graphical user interfaces for visualizing and manipulating nodes.

2. Description of Related Art

In the field of computer graphical user interfaces (GUIs), there is competition between the amount of space available for representing data and the usability of the interface to be produced. In representing hierarchical data, this competition is extremely important because the user of this data gains important information not only from the data itself, but also from the relationships between the data.

Figure 1:
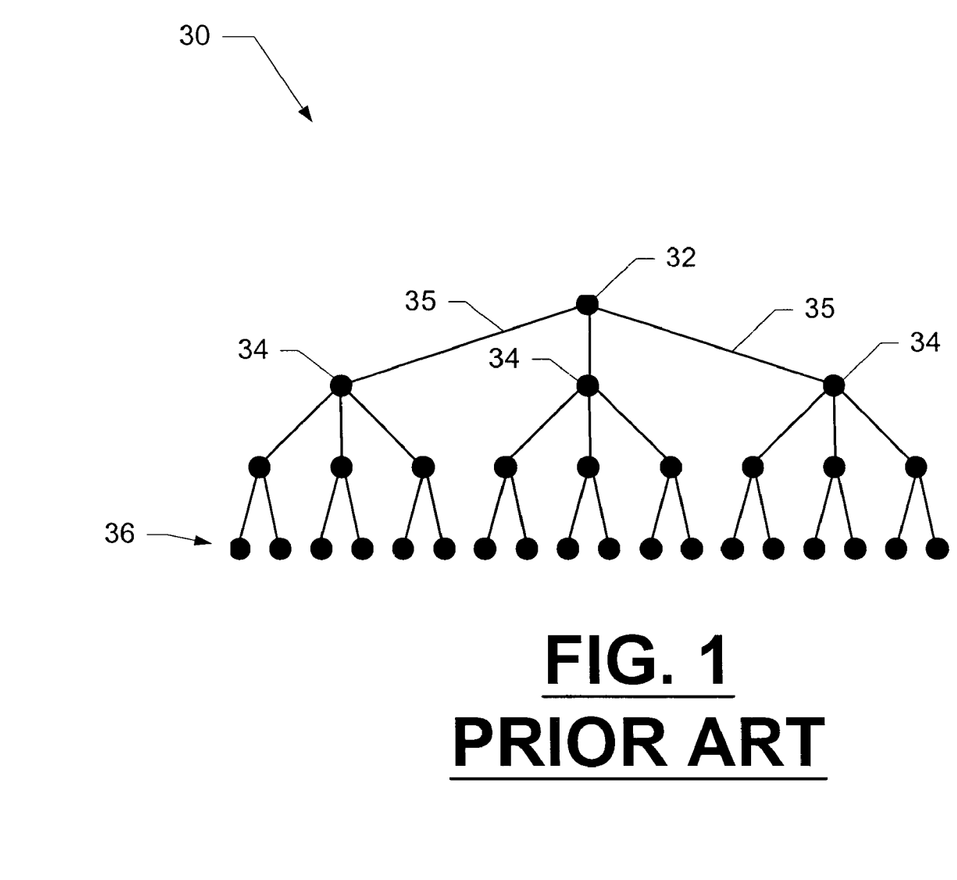
FIG. 1 is a graphical representation of a 2D tree of a prior art technique.

FIG. 1 depicts at 30 a traditional representation of hierarchical data called a 2D tree. This structure consists of a plurality of tree nodes connected by a plurality of edges. For example, parent node 32 connects to one or more child nodes 34 via edges 35. The tree ultimately terminates at leaf nodes 36. A difficulty with the 2D tree approach is the size of the graph. A 2D tree quickly exceeds the capacity of most conventional means of displaying the graph. While it is possible to represent the 2D tree with hundreds of nodes so that all nodes are visible, the size of the edges and nodes make this 2D tree effectively useless for many applications.

Figure 2:
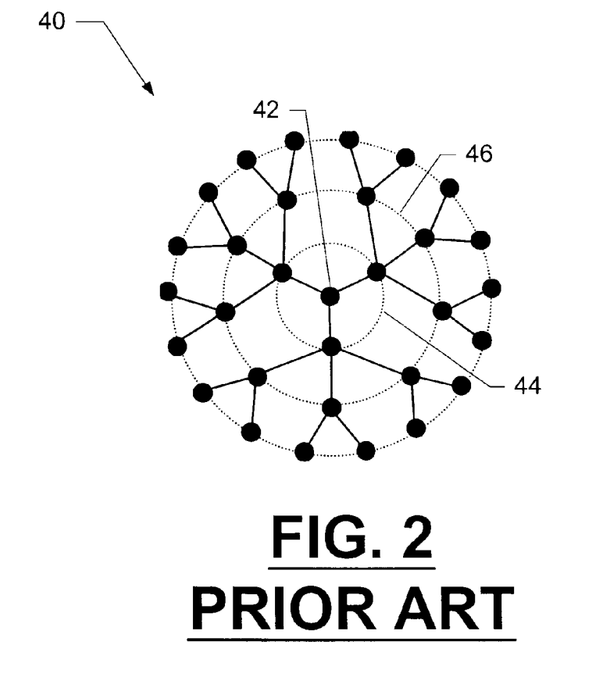
FIG. 2 is a graphical representation of a radial tree of a prior art technique.

In response to this problem, several alternative tree layouts have been developed. One of these layouts of a tree is a radial layout tree 40 of which an example is depicted in FIG. 2. In the radial tree 40, the root node 42 is located at or about the center of the tree 40, with the children nodes (i.e., level one nodes) being placed in the first ring 44 about the root node 42. The next generation of children nodes (i.e., level two nodes) are placed in a second ring 46 about the first ring 44, and so on. A difficulty arises that when many nodes are added to a radial tree, the nodes become too small or close together to be easily examined by a user.

Figure 3:
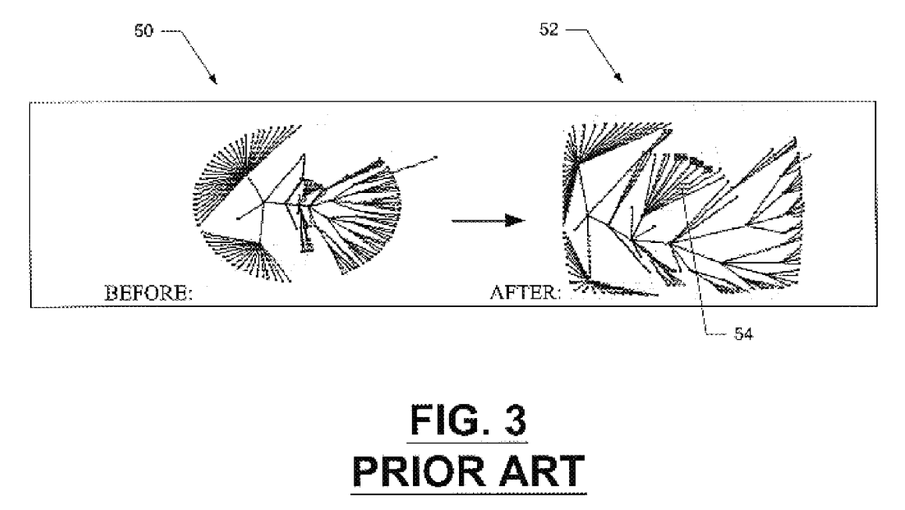
FIG. 3 is a graphical representation of a radial tree before and after applying a prior art fisheye transformation technique.

Fisheye distortion techniques have been applied to the radial tree that use a user-defined area to enlarge and occupy more space with the non-focus areas being shrunken to occupy less space. For example, FIG. 3 depicts at 50 a radial layout tree prior to a fisheye distortion. The fisheye distortion technique results in the distorted radial tree shown at 52. The fisheye distortion technique causes compression equally in all directions, based on the radial distance from the focus point 54. Despite such approaches as the fisheye technique and others, the problem remains (as well as other problems) that on hierarchical trees with large numbers of nodes, the nodes (such as the leaf nodes) are too compacted to provide an adequate level of detail for ease of comprehension by the user.

SUMMARY

The present invention overcomes these and other problems of the aforementioned techniques. In accordance with the teachings of the present invention, a computer-implemented method and system are provided to display nodes on a display device. First positions are used for locating a first node and a second node on the display device. The first node and second node are separated from each other and are at least substantially equidistant from a predetermined center position. Second positions are determined for the first node and second node such that angular shift of the first node from its first position to its second position is different in magnitude than angular shift of the second node from its first position to its second position. These angular shifts for the first node and second node are with respect to the center position. The first node and second node are displayed on the display device based upon the determined second positions for the first node and second node.

DETAILED DESCRIPTION OF THE PREFERRED EMBODIMENT

Figure 4:
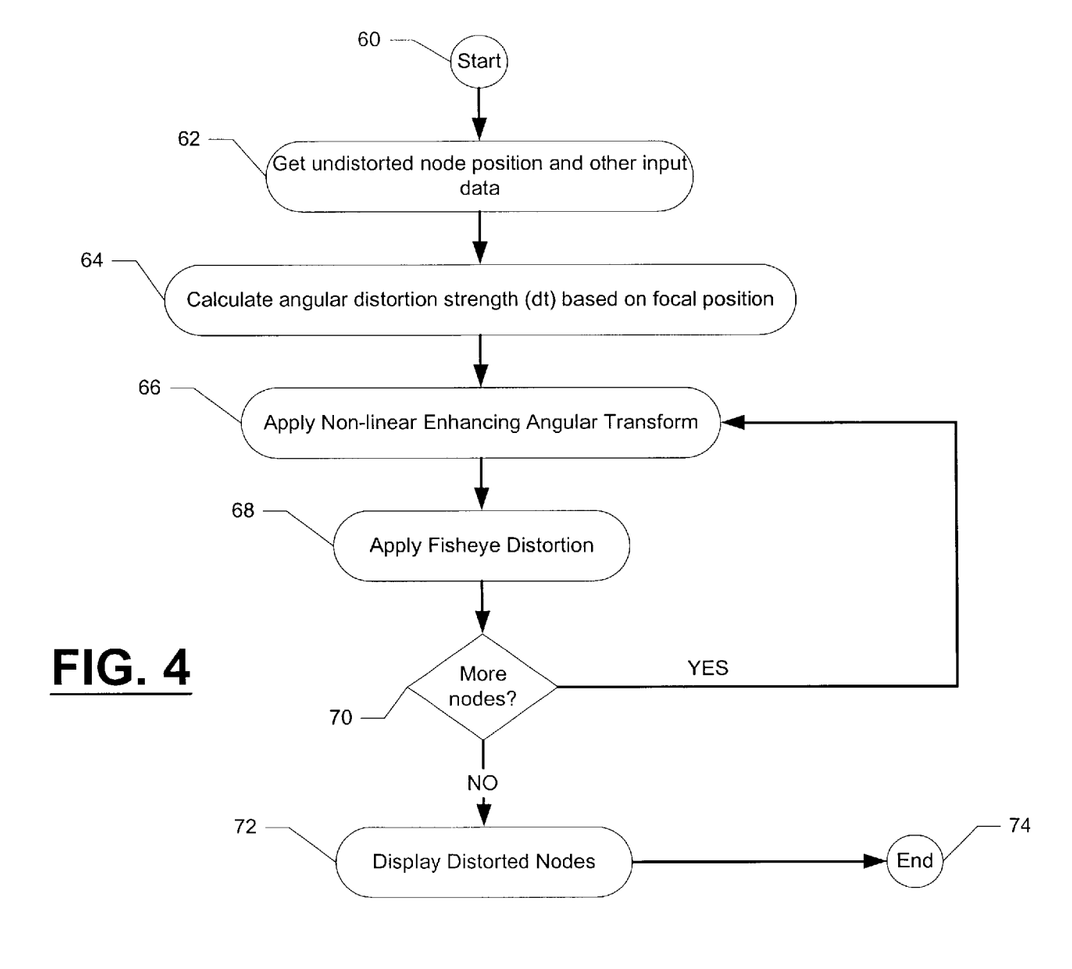
FIG. 4 is a flowchart depicting steps used by the present invention to calculate new node positions of a node tree.

FIG. 4 depicts the system-level steps used by the present invention to distort nodes of a radial tree (or any other hierarchical arrangement of data nodes) such that a user may more easily see the nodes of interest on a computer display device. The nodes may be arranged in many different configurations and represent many different types of information, such as file storage hierarchies and company organization charts to list but a few. The present invention may also be used with non-hierarchical node configurations, such as web log path data (which tracks among many other things the web pages a user views) or constellation charts.

With reference to FIG. 4, start block 60 indicates that at step 62 the present invention obtains an undistorted position for a node on the radial tree as well as the current focus position on the display device and the current "center" position of the radial tree. The undistorted node position may be expressed in terms of x-y coordinates on the display device. It should be understood that the display device includes any computer visual communication device, such as a computer terminal, a lap-top screen, a PDA (personal digital assistant) screen, or other such devices. The focus position is typically a location on the screen as may be specified by a user through a computer mouse or other interface device. The focus position may also have been determined by a computer software program that automatically locates areas or positions of interest on the radial tree for the user.

After the input data are obtained at step 62, step 64 calculates an angular distortion strength factor based upon the focus position and a user-supplied constant. The angular distortion strength factor determines how much angular transformation is generated by the present invention. If the user wants the present invention to perform less angular transformation, then the user specifies a lower value. If the user wants the present invention to perform a greater amount of angular transformation, then the user specifies a higher value. The angular distortion strength factor is also based upon the focus position relative to the center of the display screen. The further away the focus position is from the center of the display screen, the greater is the angular distortion strength factor.

For example, if the user wishes to have maximum angular distortion, the user may specify a distortion factor ("fac") which is the maximum value within a distortion range of one to ten. The x and y values in this example for the focus position are: fx=0.5 and fy=0.0 relative to the center of the display screen. The angular distortion strength factor ("dt") is determined as:

$$dt=fac*sqrt(fx*fx+fy*fy)$$

$$dt=10*sqrt(0.5*0.5+0*0)$$

$$dt=10*0.5$$

$$dt=5$$

This determined value is used in the enhancing angular transformation to effect how much angular displacement is performed upon the nodes by the present invention. It should be understood that an angular distortion strength factor may be determined in many different ways so as to suit the application at hand. The present invention may use a default value for the angular distortion strength factor so that the user does not have to specify a value.

Step 66 applies a non-linear enhancing angular transformation upon the node in order to distort the node non-uniformly with respect to one or more nodes. Step 68 applies a fisheye distortion to the node after the node's position has been angularly distorted by step 66. Decision block 70 examines whether any more nodes of the radial tree remain to be processed. If there are, then processing continues at step 66 so that the enhancing angular transformation may be determined for the next node. If no more nodes remain to be processed, then the distorted nodes are displayed at step 72 before processing terminates at end block 74.

The steps of the flowchart may be implemented via many different types of software. The software may be stored on any computer readable medium, such as a computer hard drive, a removable storage medium (e.g., CD-ROM), a network storage device, to name but a few.

Figure 5:
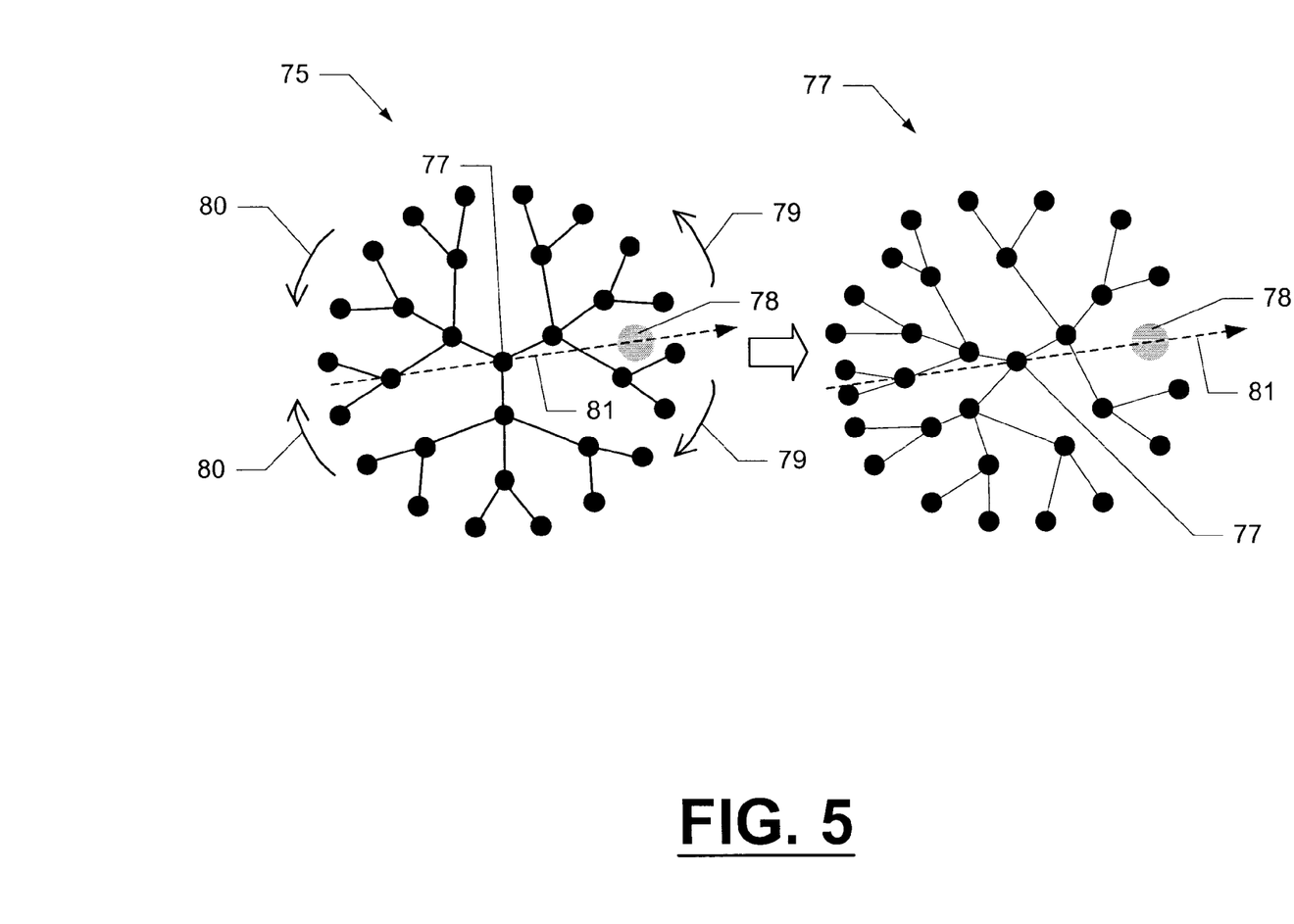
FIG. 5 is an exemplary graphical diagram depicting a node tree before and after application of the present invention.

FIG. 5 depicts at 75 a node tree before application of the present invention's enhancing angular transformation, and depicts at 77 the node tree after application of the present invention's enhancing angular transformation. The focus direction 81 (from the center 77 to the focus position 78) determines which nodes are to be compressed and which nodes are to be expanded. More specifically, the present invention uses the focus direction 81 to cause the angular dispersion of nodes that are located generally in the direction of the focus direction 81. The nodes of the radial tree 75 are pushed along a circular arc in a direction opposite of the movement of the focus position 78, such that a node that is at the same level as another node may be angularly shifted with a different magnitude than the other node. This causes a reduction of the node density in the focus direction 81 and an increase in the node density in the opposite direction. Arrows 79 illustrate which nodes are expanded, and arrows 80 indicate which nodes are compacted.

Figure 6A:
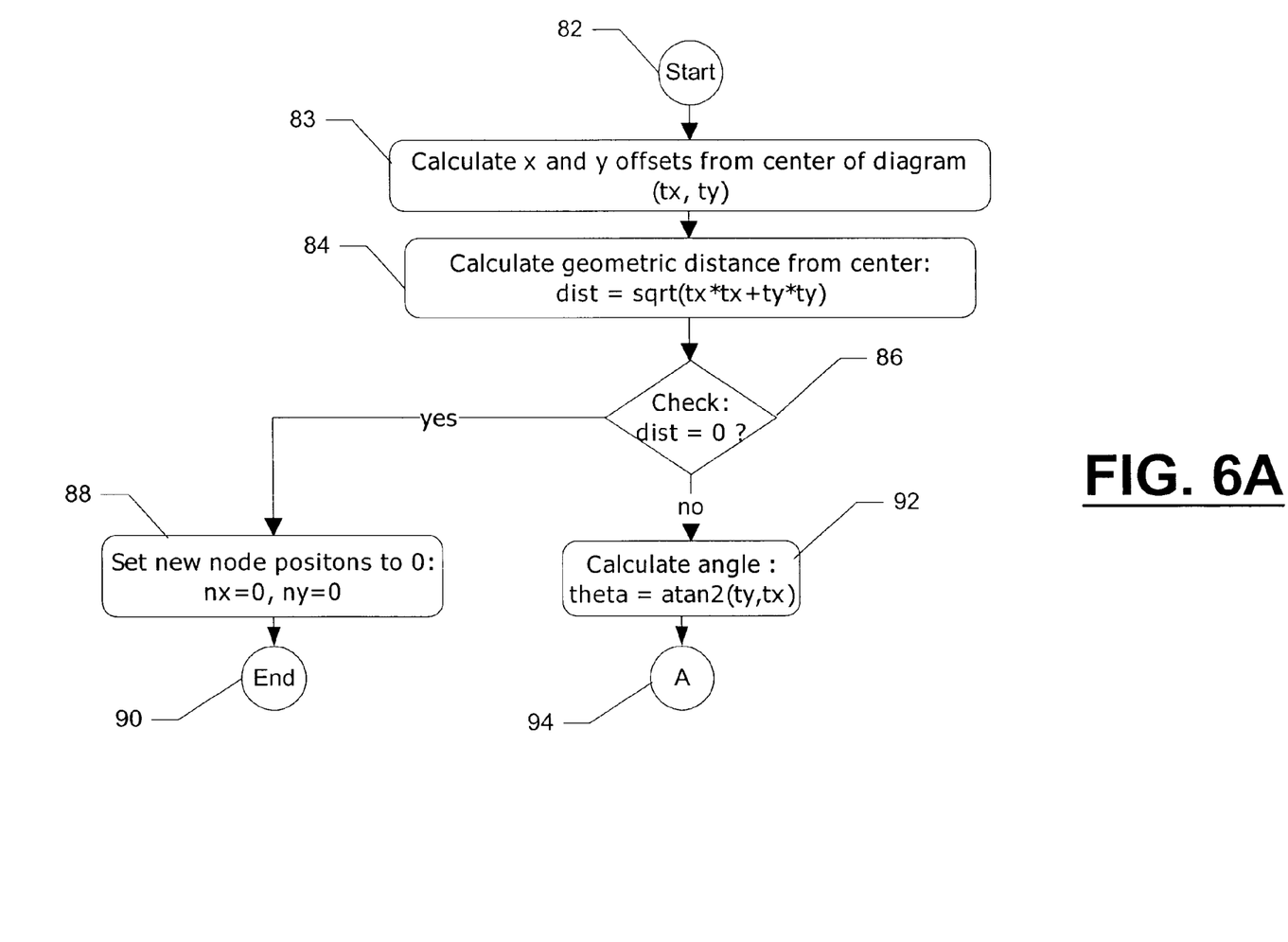
FIGS. 6A and 6B are flowcharts depicting steps used by the present invention to perform the enhancing angular transformation.
Figure 6B:
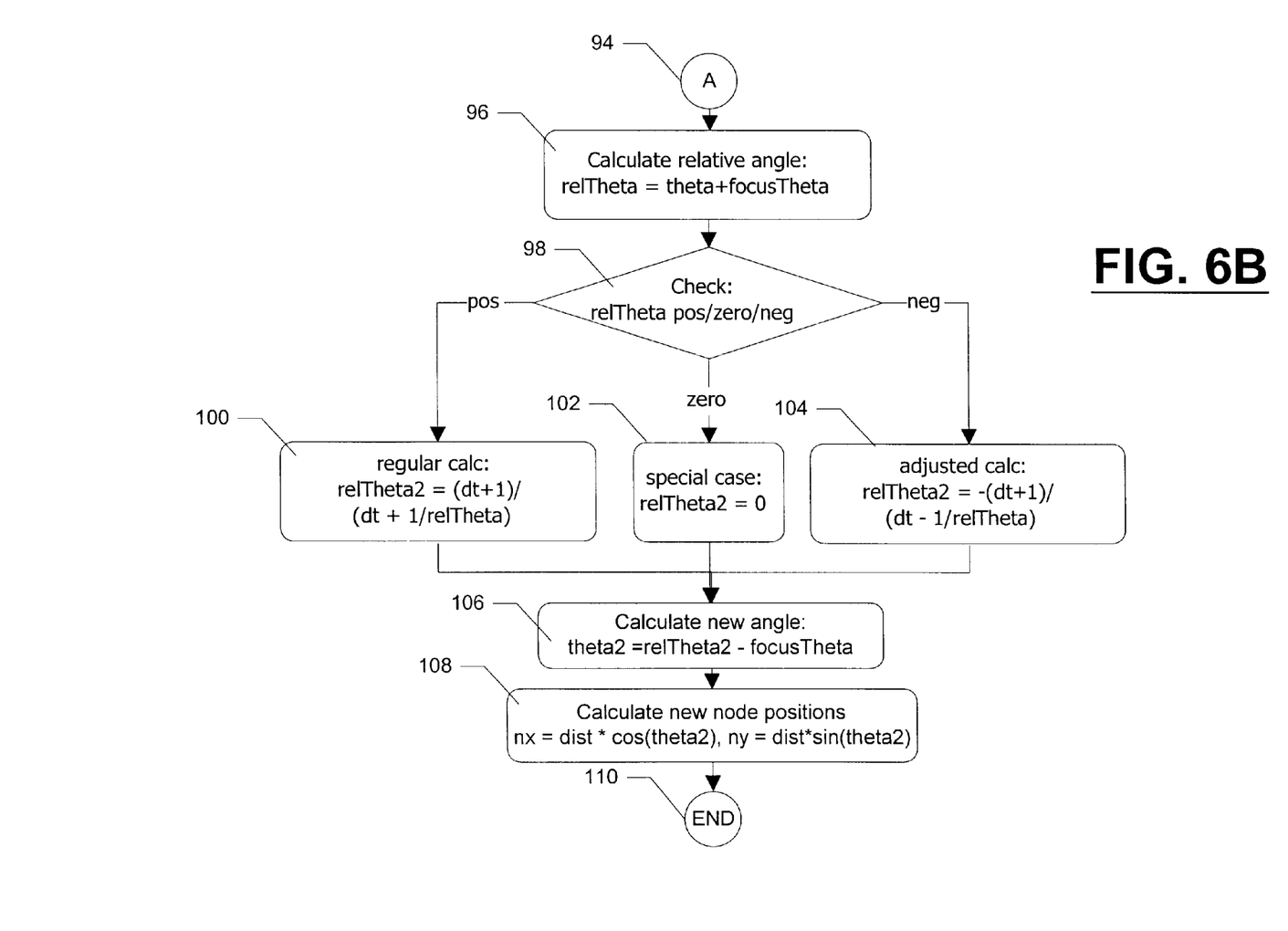

FIGS. 6A and 6B are flowcharts showing steps used by the present invention to perform the present invention's enhancing angular transformation of the nodes. Start block 82 indicates that at step 83, the distance that the input node is offset from the center of the screen is calculated using the x and y coordinates of the input node. It should be understood that the present invention is not limited to only x and y coordinate systems, but includes any position locating system, such as polar coordinates and other such systems. The calculated distances are stored in the variables tx and ty.

Step 84 calculates the geometric distance from the center. The center is typically the center position of the display region of the screen, but may also include the center of the radial tree or another predetermined location as may be determined by the user or automatically by a computer software program. The node's geometric distance from the center is determined using the function:

$$distance=sqrt(tx*tx+ty*ty)$$

Decision block 86 examines whether the calculated distance is zero. If the distance is zero, then step 88 sets the new node positions to zero:

$$nx=0, ny=0$$

End block 90 returns the processing to the main flowchart (of FIG. 4) if no more nodes need processing. However, if the distance does not equal zero as determined by decision block 86, then control passes to step 92 which calculates angle theta for the node:

$$theta=atan2(ty,tx)$$

Processing continues on FIG. 6B as indicated by continuation block 94. With reference to FIG. 6B, step 96 calculates a relative angle theta for the node:

$$reltheta=theta+focustheta$$

(where: focustheta is the angle of the focus position with respect to the center).

Decision block 98 examines whether the relative theta angle is positive, negative or zero. If the relative theta angle is positive, then a new relative theta angle is calculated by step 100 as follows:

$$reltheta2=(dt+1)/(dt+1/reltheta)$$

If the relative theta angle is negative as determined at decision block 98, then a new relative theta angle is calculated by step 104 as follows:

$$reltheta2=-(dt+1)/(dt-1/reltheta)$$

If the relative theta angle is zero as determined at decision block 98, then a new relative theta angle is calculated by step 102 as follows:

$$reltheta2=0$$

Step 106 uses the new relative theta angle to determine an enhancing angular distortion value which is calculated as follows:

$$theta2=reltheta2-focustheta$$

Step 108 calculates a new node position as follows:

$$nx=distance*cos(theta2), ny=distance*sin(theta2)$$

Processing of the node terminates at end block 110. Additional nodes are processed in a similar manner.

Figure 7:
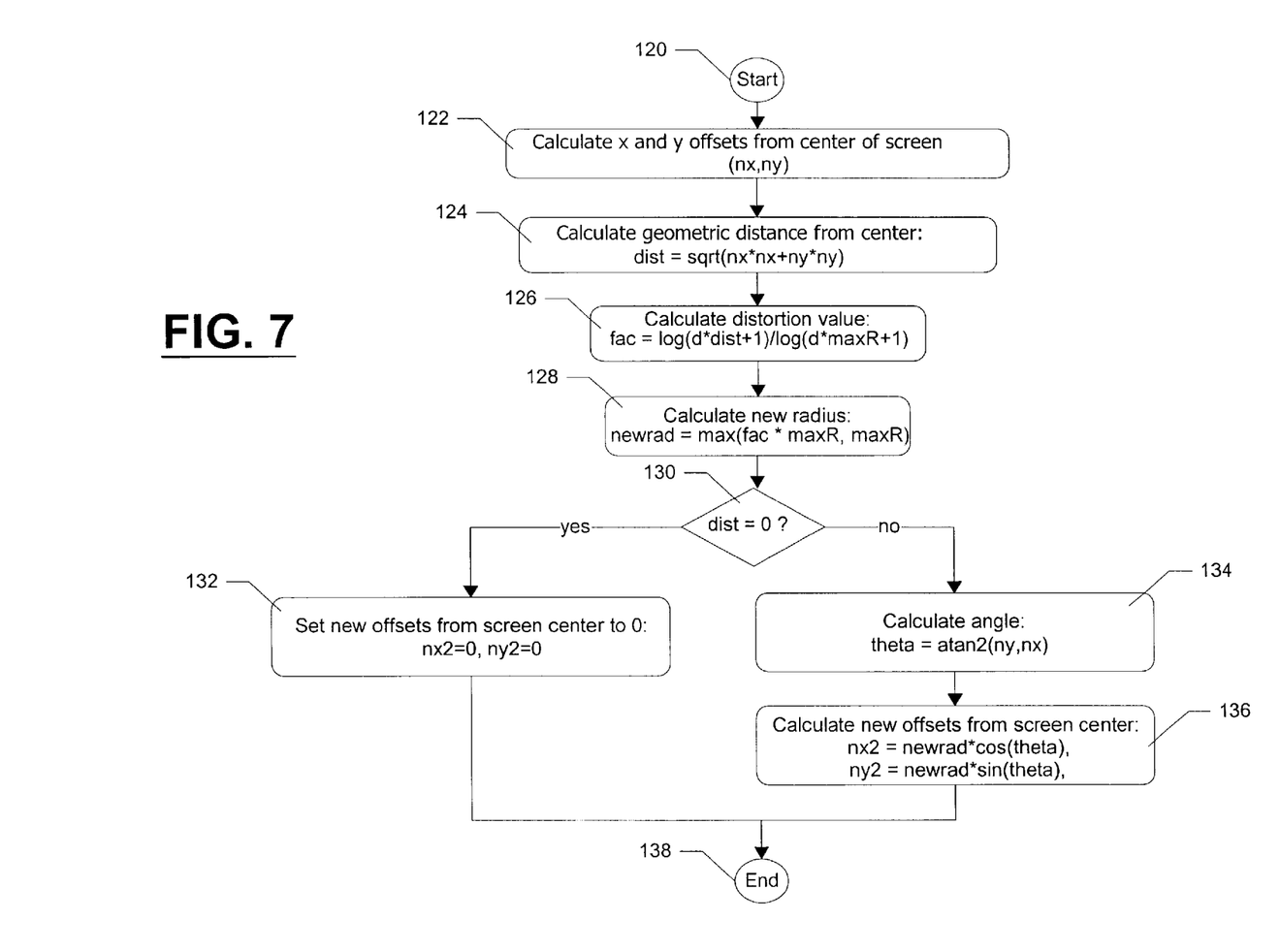
FIG. 7 is a flowchart depicting the steps used by the present invention to apply fisheye distortion to a node tree.

FIG. 7 depicts steps for applying fisheye distortion to a radial tree. It should be understood that the fisheye distortion or a similar distortion technique may be used before, during, or after the enhancing angular transformation. For example, each node may undergo the enhancing angular transformation and then the fisheye distortion is performed on the nodes; or a node may undergo a fisheye distortion and then an enhancing angular transformation with succeeding nodes being likewise processed.

Start block 120 indicates that step 122 retrieves the new node positions (nx, ny) that have been determined by the enhancing angular transformation step. Step 124 calculates the geometric distance of a node from the center using the function:

$$\text{distance}=\text{sqrt}(nx*nx+ny*ny)$$

Step 126 calculates the distortion value as follows:

$$\text{fac}=\log(d*\text{distance}+1)/\log(d*\text{maxR}+1),$$

where "d" is the fisheye distortion factor which the user may specify as a value equal to or greater than one.

Step 128 calculates a new radius as follows:

$$\text{newrad}=\max(\text{fac}*\text{maxR}, \text{maxR})$$

Decision block 130 examines whether the distance as calculated in step 124 is zero. If the distance is zero, then the new offsets from the center are set by step 132 to zero (nx2=0, ny2=0) and the program ends at end block 138.

If the distance does not equal zero as determined by decision block 130, then step 134 calculates the angle theta as follows using the arctangent function:

$$\text{theta}=\text{atan2}(ny,nx)$$

Step 136 calculates the new offsets from the center as follows:

$$nx2=\text{newrad}*\cos(\text{theta}), \; ny2=\text{newrad}*\sin(\text{theta})$$

The program ends at end block 138.

Figure 8:
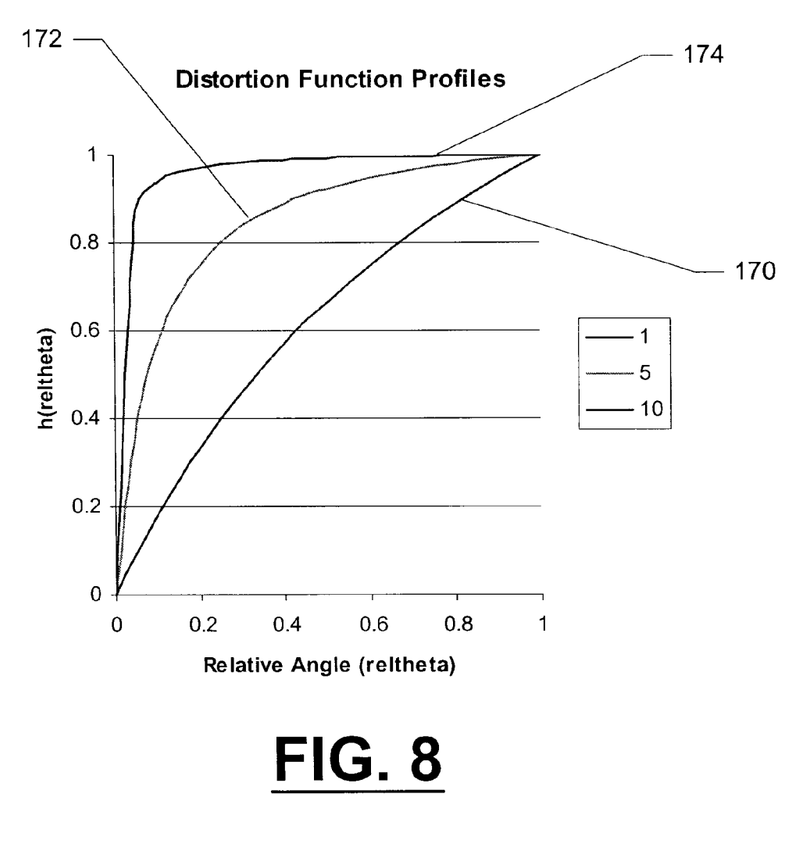
FIG. 8 is an x-y graph depicting interrelationships between distortion functions and relative angles at different angular distortion values.

FIG. 8 is a graphical representation of the present invention's distortion function at several values of the user-supplied angular distortion factor. The abscissa axis is the relative angle, and the ordinate axis is the amount of distortion on a scale from zero to one. Curve 170 represents the distortion function profile (h(reltheta)) with the angular distortion factor at a relatively low value of one. Curve 172 represents the distortion function profile (h(reltheta)) that has an angular distortion factor at a higher value of five. Curve 174 represents the distortion function profile (h(reltheta)) with the angular distortion factor at a still higher value of ten.

The abscissa axis represents the absolute values of the normalized relative theta angles—that is, the angles with respect to the focus direction divided by the mathematical constant PI. The focus direction may be described as the vector between the root of the tree (or any other predefined center) and the focus point. The relative angle is zero for all the points on the line in the direction of the focus direction starting from the origin. It has a value of one for the points on the line in the negative direction of the focus direction starting from the origin, and somewhere in between for the remaining points. The ordinate axis contains the distorted value. There is no distortion for the points on the line in the focus direction passing through the origin irrespective of the factor. Points closer to zero have more distortion causing the expansion. For example, curve 172 demonstrates that relative angle ranges near zero (e.g., 0–0.2) are expanded almost four times (0–0.8) when the angular distortion factor is five. Relative angle ranges for the curve 172 further from zero (e.g., 0.8–1.0) are compressed almost one hundred times smaller (0.998–1.0). As amore specific example for curve 172, the "0.1" value is distorted to "0.5" giving 50% space to 10% of the points, and the remaining 90% of the nodes get compressed in the remaining 50% of the space.

EXAMPLE

Figure 9:
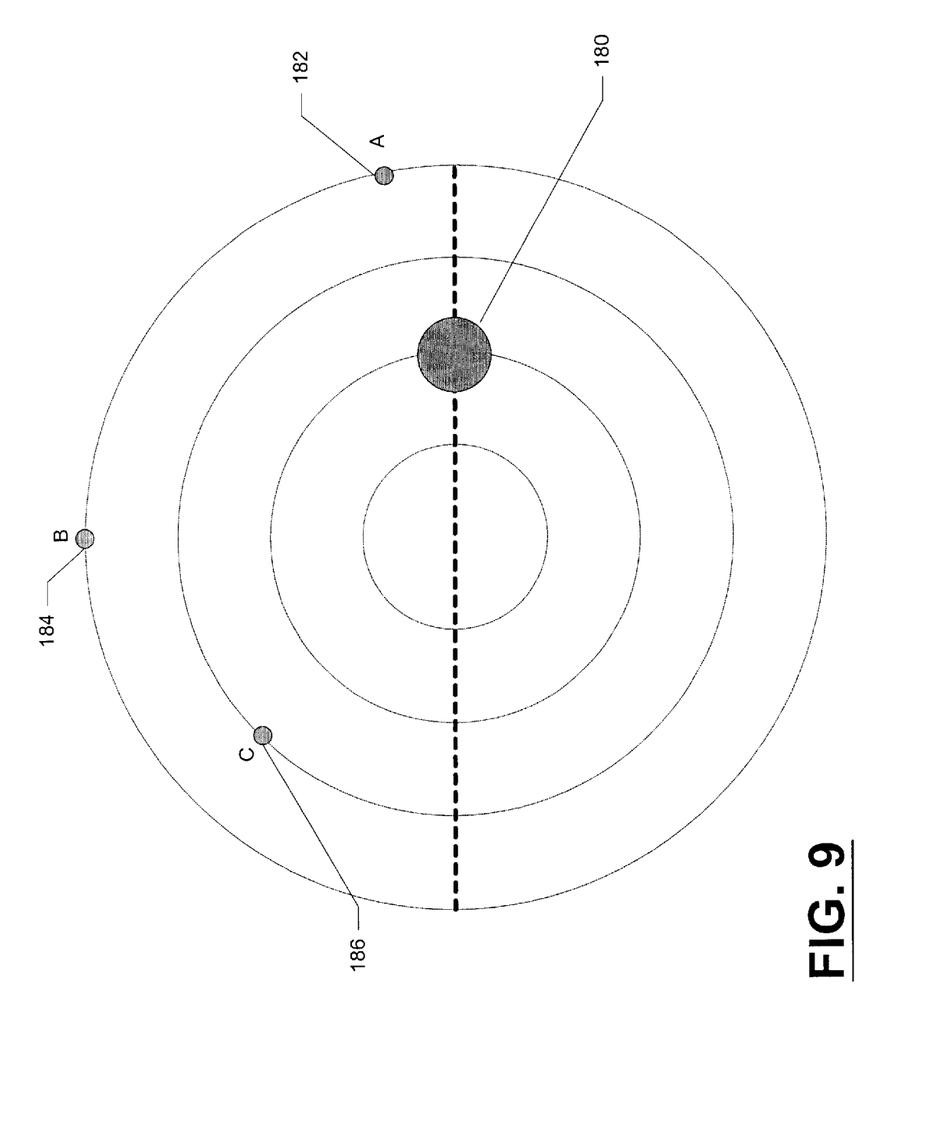
FIGS. 9–11 are graphical representations of nodes being distorted in accordance with the teachings of the present invention.

Consider three nodes (A 182, B 184, and C 186) and a focus point F 180 as shown in FIG. 9. Assume the following values: A={0.985, 0.174}; B={0.0, 1.0}; C={−0.530, 0.530}; F={0.5, 0.0}; fac=10 (which is a user-supplied value for maximum angular distortion).

The calculation of the distortion strength factor, dt, may be done before looping through the nodes in the following manner. With the x and y values for the focus position known (that is, fx=0.5 and fy=0.0), the distortion strength is:

$$dt=\text{fac}*\text{sqrt}(fx*fx+fy*fy)$$

$$dt=10*\text{sqrt}(0.5*0.5+0*0)$$

$$dt=10*0.5$$

$$dt=5$$

The focus angle may be calculated as:

$$\text{focustheta}=\text{atan}(fy,fx)$$

$$\text{focustheta}=\text{atan}(0.0, 0.5)$$

$$\text{focustheta}=0°$$

Now, consider node A. Here tx=0.985 and ty=0.174. The original theta angle of node A is:

$$\text{theta}=\text{atan}(ty,tx)$$

$$\text{theta}=\text{atan}(0.174, 0.985)$$

$$\text{theta}=5°$$

The relative theta angle value is calculated as:

$$\text{reltheta}=(\text{theta}-\text{focustheta})/180$$

$$\text{reltheta}=(5-0)/180$$

$$\text{reltheta}=(5/180)$$

$$\text{reltheta}=0.028$$

Now the distortion function is calculated:

$$h(t)=\text{reltheta2}=(dt+1)/(dt+1/\text{reltheta})$$

$$h(t)=\text{reltheta2}=(5+1)/(5+1/0.028)$$

$$h(t)=\text{reltheta2}=6/41$$

$$h(t)=\text{reltheta2}=0.146$$

The new angle for node A is:

$$\text{theta2}=\text{focustheta}+\text{reltheta2}*180$$

$$\text{theta2}=0+0.146*180$$

$$\text{theta2}=0+26.34$$

$$\text{theta2}=26.34°$$

Finally, the new coordinates for A are calculated as:

distance=sqrt(*tx*\**tx*+*ty*\**ty*)

distance=sqrt(0.985\*0.985+0.174\*0/174)

distance=1.0

*nx*=distance\*cos(theta2)

*nx*=1.0\*cos(26.34)

*nx*=0.986

*ny*=distance\*sin(theta2)

*ny*=1.0\*sin(26.34)

*ny*=0.444

Figure 10:
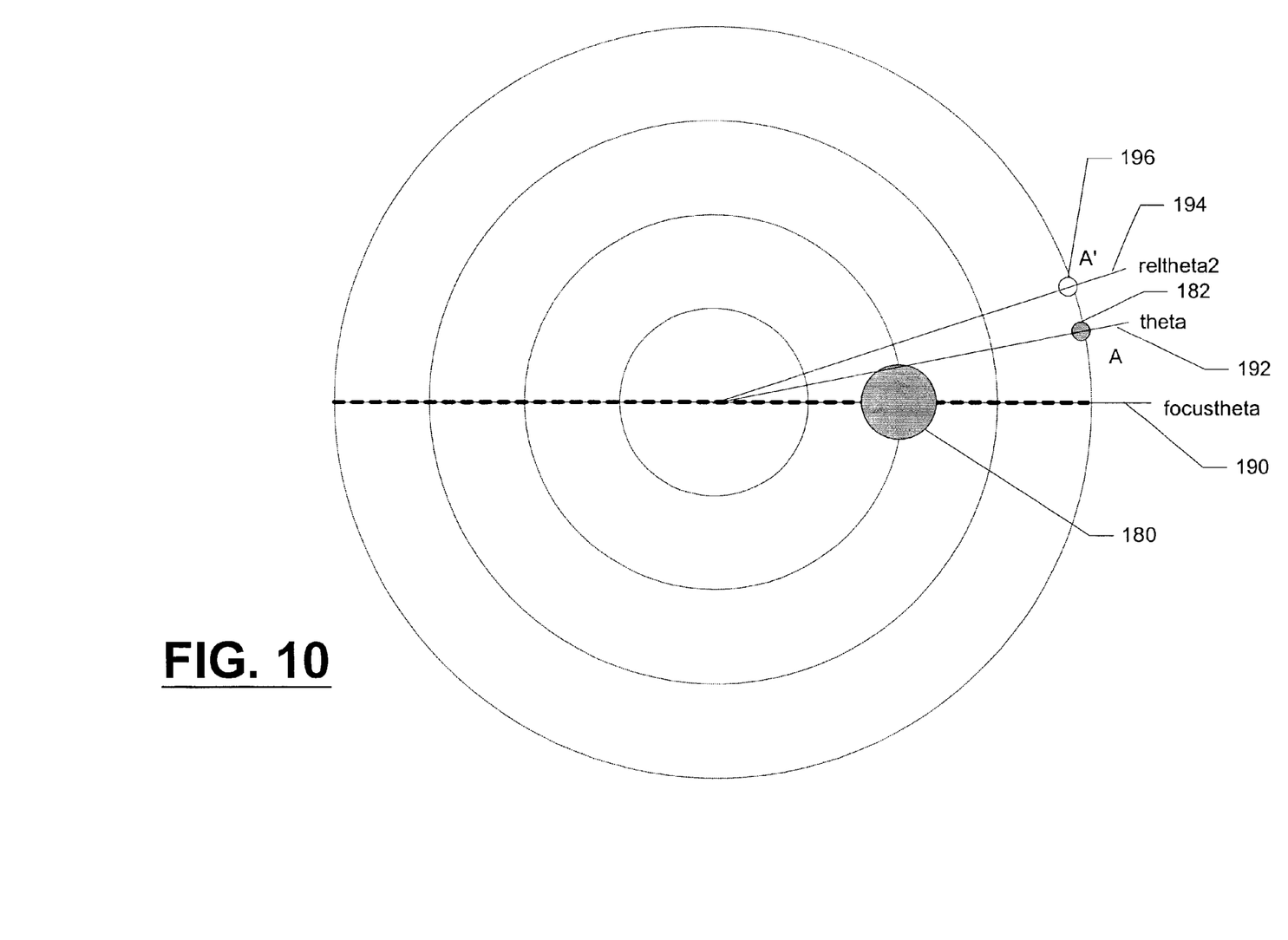

FIG. 10 shows node A' 196 which is the new position of node A 182 due to its angular shifting by the present invention. FIG. 10 also graphically shows for the node A 196 such other intermediately calculated values as: focustheta at 190, theta at 192, and reltheta2 at 194. Note that because the radius is maintained, node A' 196 remains in the same circle.

The values for node B are as follows (where tx=0.0 and ty=1.0):

Original angle of node B: theta=90°

Relative angle value: reltheta=0.5

Distorted value: reltheta2=0.857

New angle for node B: theta2=154.285°

New coordinate for B: {−0.896, 0.444}

The values for node C are as follows (where tx=−0.530 and ty=0.530):

Original angle of node C: theta=135°

Relative angle value: reltheta=0.75

Distorted value: reltheta2=0.947

New angle for node B: theta2=170.526°

New coordinate for B: {−0.740, 0.123}

Figure 11:
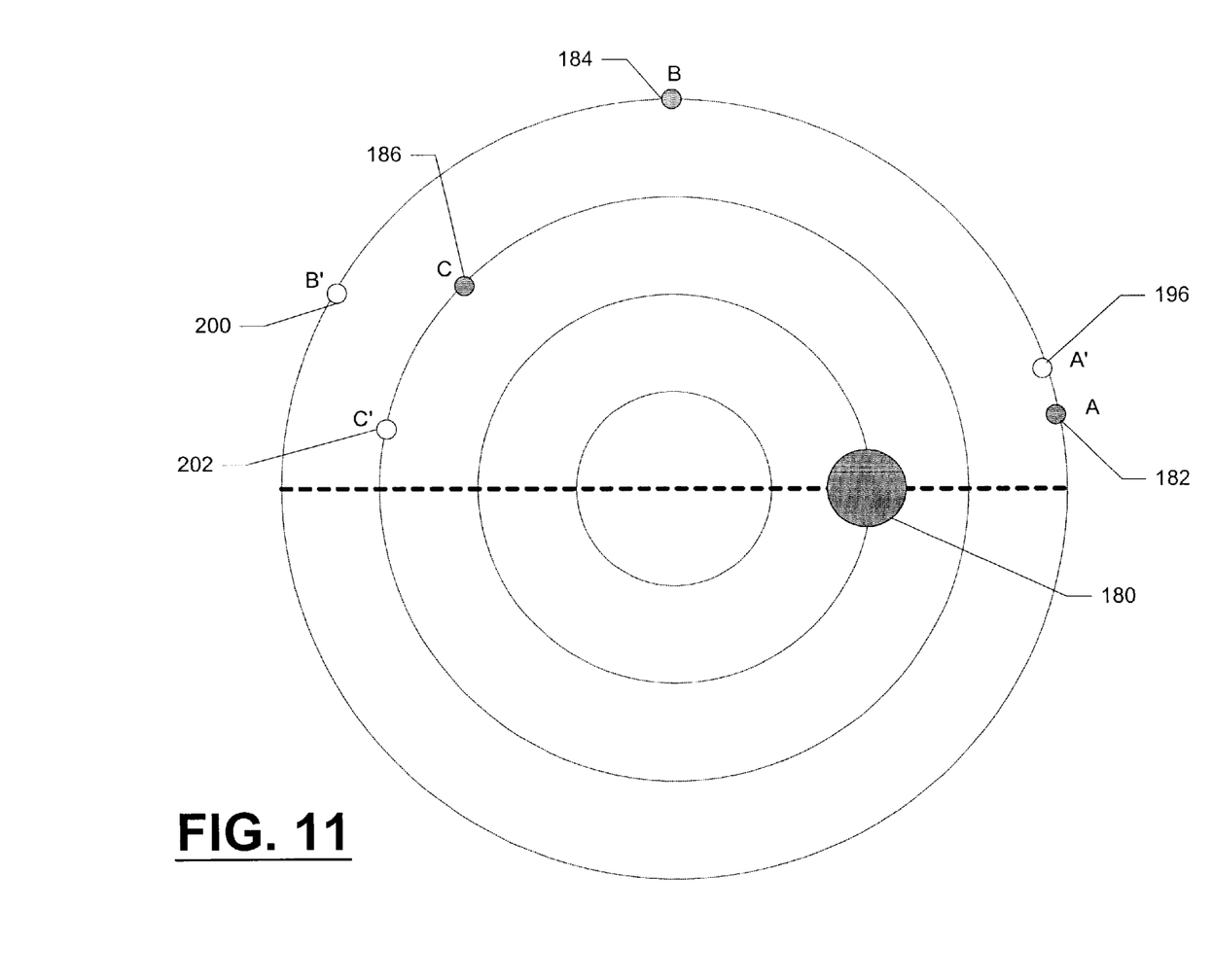

The new positions of nodes A 182, B 184, and C 186 (after the enhancing angular transformation) are respectively depicted as nodes A' 196, B' 200, and C' 202 in FIG. 11. It is noted that despite nodes A and B being substantially equidistant from the center, they are angularly shifted by a significantly different magnitude.

Figure 12:
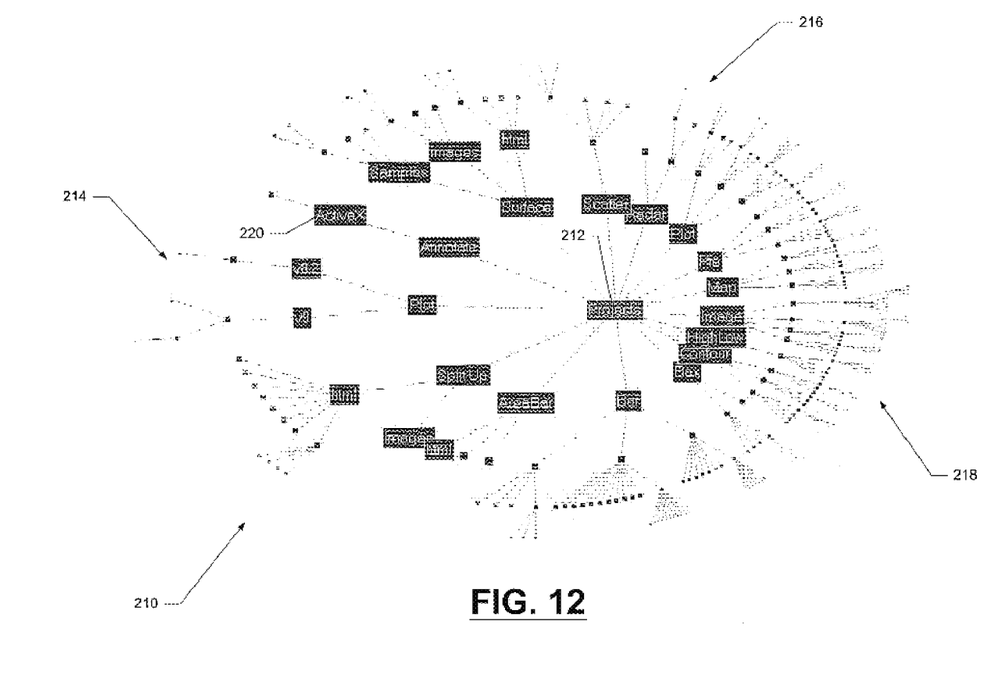
FIG. 12 is an exemplary graphical representation of a radial tree with level-of-detail labels.

FIG. 12 depicts the present invention using a level-of-detail technique along with the enhancing angular transformation. With reference to FIG. 12, a radial tree 210 has been distorted through the teachings of the present invention. The focus position for this example is located to the left of the "Projects" label 212. With such a focus position, the present invention expands nodes 214 while compressing nodes 216 and still further compressing nodes 218. In addition to the expansion and compression by the present invention, the present invention provides node labels, such as "Projects" label 212 for the root node of the radial tree 210 and "ActiveX" label 220 for another node. Thus, the present invention may communicate even greater information by not only providing expansion to nodes in an area of interest, but also labels for those nodes.

It will be appreciated that the above description relates to the preferred embodiments by way of example only. Many variations on the invention will be readily apparent to those knowledgeable in the field, and such variations are within the scope of the invention as described and claimed.

It is claimed:

1. A computer-implemented method for displaying nodes on a display device, comprising the steps of:
   receiving first positions for locating a first node and a second node on the display device,
   wherein the first node and second node are separated from each other and are at least substantially equidistant from a predetermined center position on the display device;
   determining second positions for the first node and second node such that angular shift of the first node from its first position to its second position is different in magnitude than angular shift of the second node from its first position to its second position,
   wherein the angular shifts for the first node and second node are determined based upon a focus position;
   wherein the focus position indicates a position of interest on the display device;
   wherein the angular shifts for the first node and second node are with respect to the center position; and
   displaying the first node and second node on the display device based upon the determined second positions for the first node and second node.

2. The method of claim 1 wherein the nodes convey information.

3. The method of claim 2 wherein the nodes form a node tree.

4. The method of claim 2 wherein the nodes form a radial node tree.

5. The method of claim 4 wherein the radial node tree has a root node.

6. The method of claim 1 wherein the center position is about center of display region of the display device.

7. The method of claim 1 wherein the center position is about center of the nodes.

8. The method of claim 1 wherein the center position is about center of the nodes that are displayed on the display device.

9. The method of claim 1 further comprising the step of:
   determining a focus direction from about the center position to the focus position,
   wherein positions of nodes located in direction of the focus direction are expanded relative to each other.

10. The method of claim 9 wherein positions of nodes located in an opposite direction of the focus direction are compacted relative to each other.

11. The method of claim 9 wherein a user specifies the focus position on the display device.

12. The method of claim 9 wherein the focus position is automatically determined on the display device.

13. The method of claim 1 further comprising the step of:
   using an angular distortion strength factor to determine at least in part how much angular shifting is used in determining the second positions.

14. The method of claim 13 wherein the user specifies the angular distortion strength factor.

15. The method of claim 13 wherein the angular distortion strength factor is based upon the focus position.

16. The method of claim 1 further comprising the steps of:
   distorting the second positions for the first node and second node; and displaying the first node and second node on the display device based upon the distorted second positions for the first node and second node.

17. The method of claim 1 further comprising the steps of:

using fisheye distortion to distort the second positions for the first node and second node; and displaying the first node and second node on the display device based upon the distorted second positions for the first node and second node.

18. The method of claim 1 further comprising the step of:

using fisheye distortion to distort the first positions for the first node and second node prior to the step of determining the second positions for the first node and the second node.

19. The method of claim 1 wherein the angular shifts for the first node and second node maintain the equidistance of the first node and the second node from the center position.

20. The method of claim 1 wherein the displaying of the first node and second node includes displaying the first node and second node with level-of-detail labels.

21. A computer readable medium encoded with software instructions for enabling a method for displaying hierarchical data nodes on a display device, said method comprising the steps of:

receiving first positions for locating a first node and a second node on the display device, wherein the first node and second node are separated from each other and are at least substantially equidistant from a predetermined center position on the display device;

determining second positions for the first node and second node such that angular shift of the first node from its first position to its second position is different in magnitude than angular shift of the second node from its first position to its second position, wherein the angular shifts for the first node and second node are determined based upon a focus position;

wherein the focus position indicates a position of interest on the display device;

wherein the angular shifts for the first node and second node are with respect to the center position; and displaying the first node and second node on the display device based upon the determined second positions for the first node and second node.

* * * * *